Patented Oct. 18, 1927.

1,645,740

UNITED STATES PATENT OFFICE.

ROBERT MILLS EVANS, OF SEATTLE, WASHINGTON.

METHOD OF TREATING THREADED SURFACES OF NUTS AND BOLTS.

No Drawing.   Application filed October 23, 1926.   Serial No. 143,799.

This invention relates to a method of treating the threaded surfaces of nuts and bolts for the purpose of causing a locked connection to be effected when they are tightened together in use. More specifically stated, the invention resides in the application of a thin coating of comparatively soft metal to the threaded surfaces of bolts and nuts which will act as a bond to hold them against unthreading after they have once been tightened together.

In carrying out the invention, it is preferred to use a coating metal that is rust proof and it is essential that it be relatively soft as compared to the degree of hardness of the metal used in making the bolts and nuts. This coating material is applied in such manner as to cover the threaded surfaces evenly and without leaving any roughness which might cause difficulty in threading the parts together. It has been found that tin is a very desirable metal for this purpose and it is the metal that is intended to be used; however, the invention is not limited only to this particular metal.

It has been found that when threaded parts that have been so treated are threaded together and are drawn tight, the coating metal practically forms a welded connection that will under all ordinary conditions prevent all unthreading due to vibration. This is due to the fact that the threaded surfaces are not absolutely smooth and the pressure applied in drawing a nut tight on its bolt causes a bond between the coatings to be effected due to pressure and this relatively soft metal to be pressed into the irregularities, or pores, of the threaded pieces to thereby effect a bond that cannot be broken except by the use of excessive wrench pressure or a tool especially designed for this purpose.

The coating of nuts and bolts in the above manner is especially desirable when they are for holding together parts which, in use operate to cause the loosening of the nuts, such as in railway track material and construction, bridge work or the like, and this coating not only forms a nut lock when the parts are in use but also serves to protect the threads against damage by rust prior to their use.

Having thus described my invention, what I claim as new therein and desire to secure by Letters-Patent, is:

1. The process of effecting a locking connection between nuts and bolts which consists in coating the threaded surfaces of the nuts and bolts with a material of a different degree of hardness and thence tightening said nuts onto said bolts under pressure.

2. The process of effecting a locking connection between nuts and bolts which consists in applying to the threaded surfaces of the nuts and bolts a coating of relatively soft metal and thence tightening said nuts onto said bolts under pressure.

Signed at Seattle, Washington, this 14th day of October, 1926.

ROBERT MILLS EVANS.